March 14, 1950
C. H. JUDISCH
2,500,546
APPARATUS FOR MOLDING TERMINALS ON ELECTRIC CONDUCTORS
Filed March 20, 1946
6 Sheets-Sheet 3
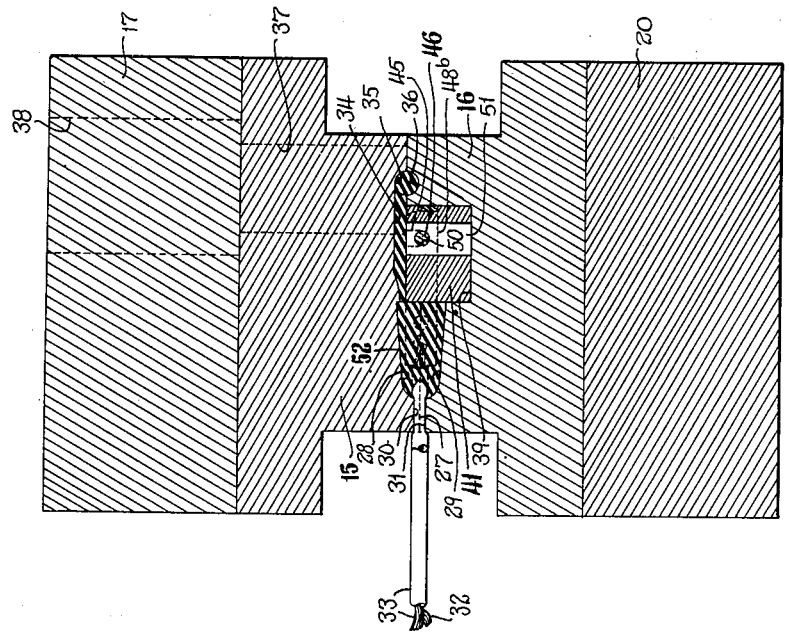
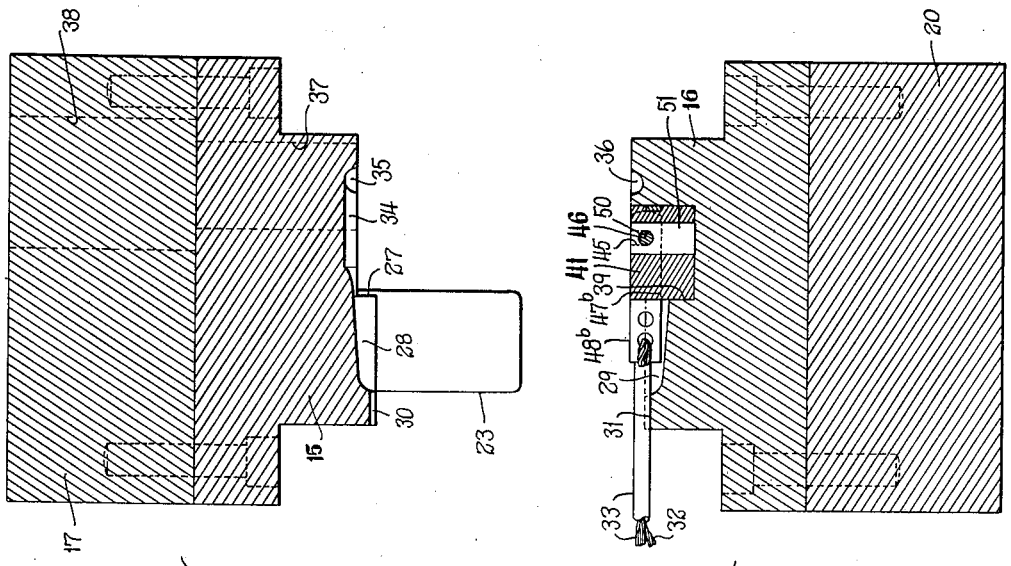
Inventor
Carl H. Judisch
By Seymour, Earle & Nichols
Attorneys March 14, 1950
C. H. JUDISCH
2,500,546
APPARATUS FOR MOLDING TERMINALS ON ELECTRIC CONDUCTORS
Filed March 20, 1946
6 Sheets-Sheet 4
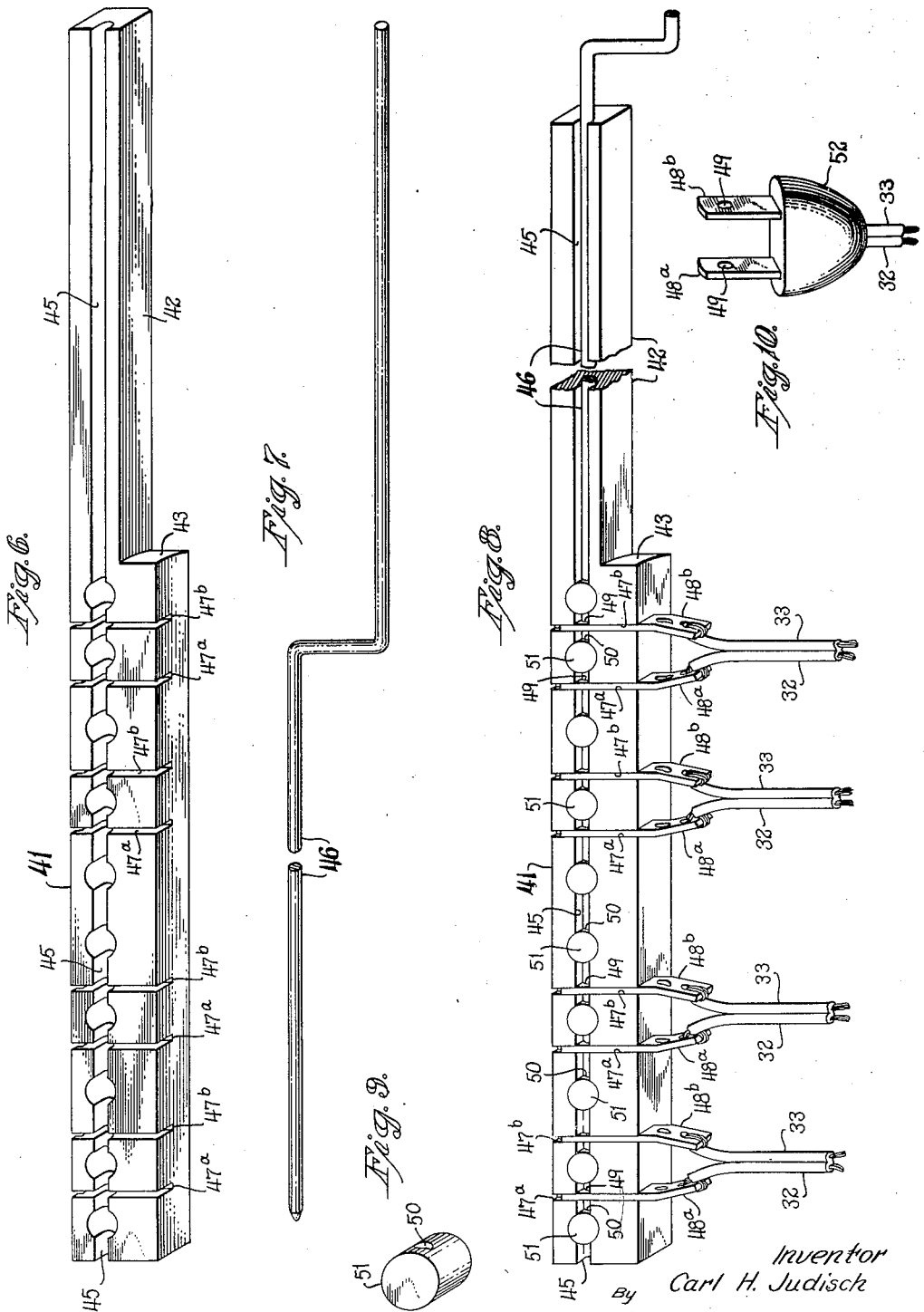
Inventor
Carl H. Judisch
By Seymour, Earle & Nichols
Attorneys

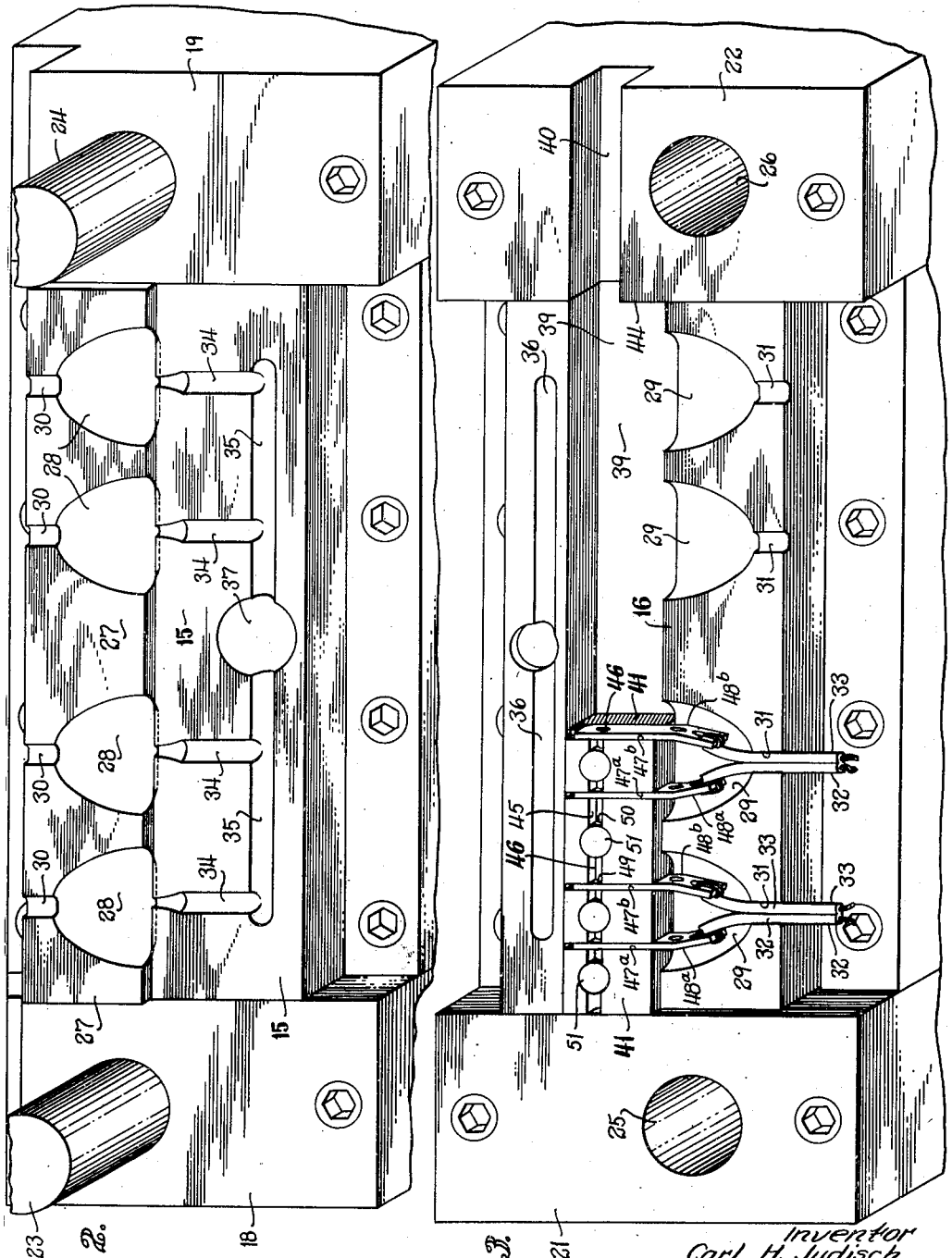

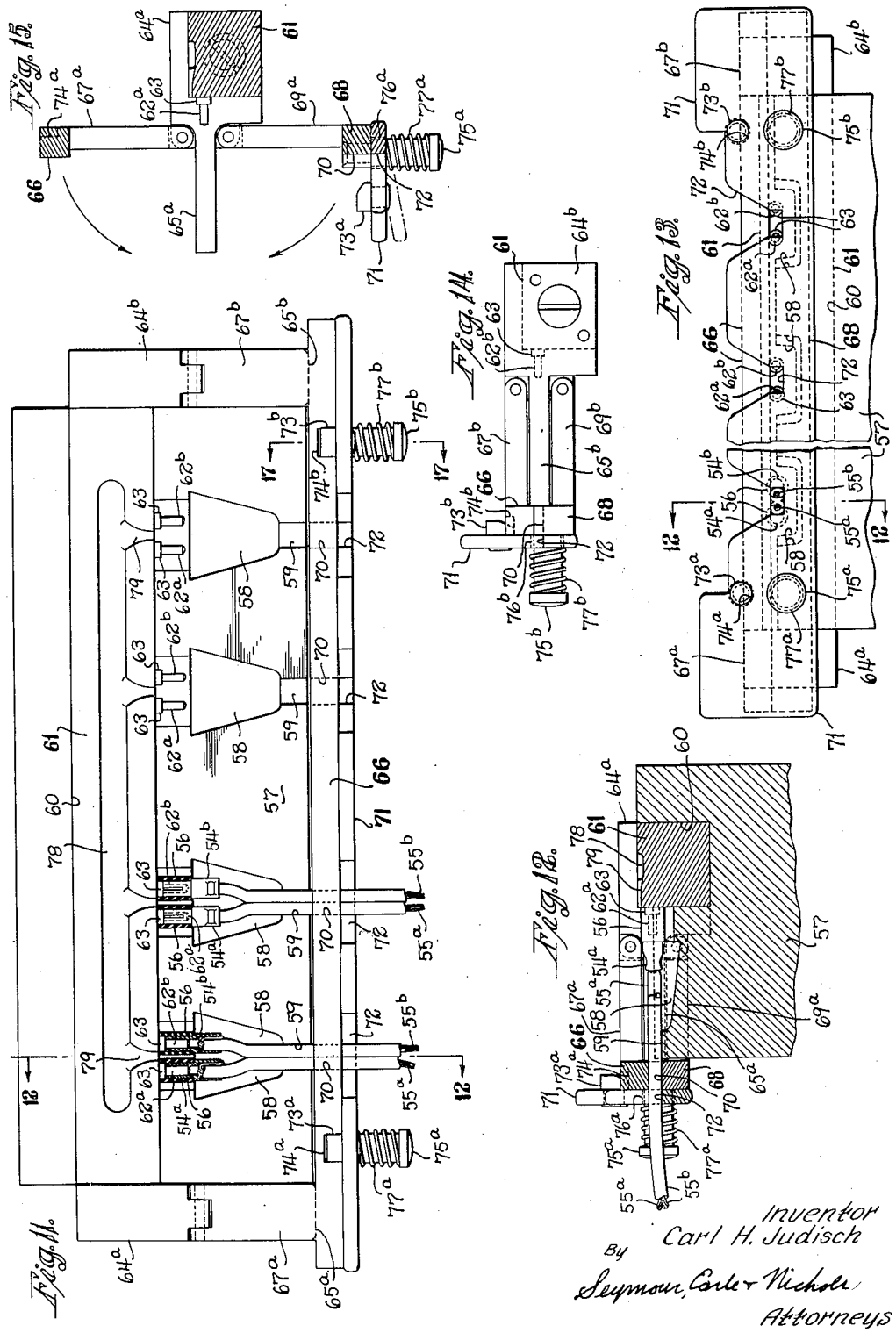

March 14, 1950
C. H. JUDISCH
2,500,546
APPARATUS FOR MOLDING TERMINALS ON ELECTRIC CONDUCTORS
Filed March 20, 1946
6 Sheets-Sheet 6
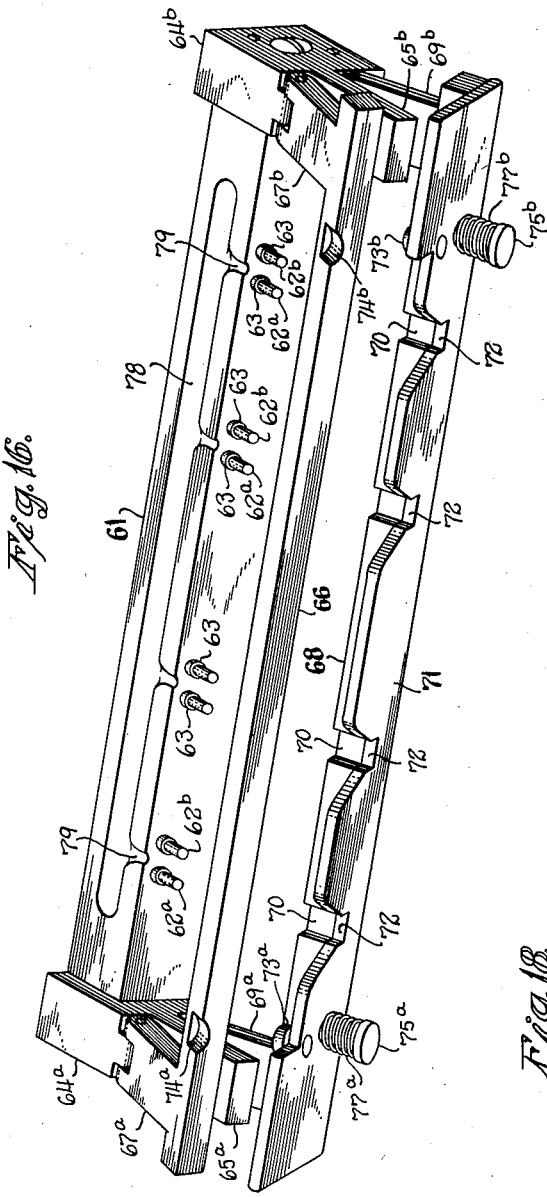
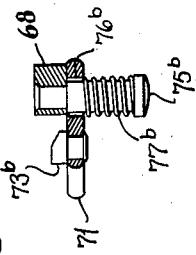
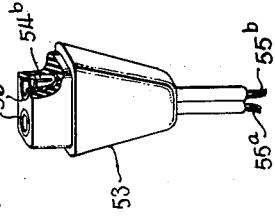
Inventor
Carl H. Judisch
By Seymour, Carler & Nichols
Attorneys Patented Mar. 14, 1950

2,500,546

UNITED STATES PATENT OFFICE 2,500,546

APPARATUS FOR MOLDING TERMINALS ON ELECTRIC CONDUCTORS

Carl H. Judisch, Hamden, Conn., assignor to The Whitney Blake Company, Hamden, Conn., a corporation of Connecticut Application March 20, 1946, Serial No. 655,732

4 Claims. (Cl. 18—36)

The present invention relates to improvements in apparatus for molding terminals on electric conductors, and has for one of its main objects the provision of a novel apparatus of the character referred to whereby the production of such terminals may be greatly speeded-up to thus effect a reduction in cost of production.

Another object of the present invention is to provide a superior apparatus of the character referred to whereby a larger number of such terminals may be produced from a given mold than has heretofore been possible with conventional apparatus.

A further object of the present invention is to provide a novel apparatus for molding terminals on electric conductors whereby a given injection-molding machine may be kept in operation with minimum time-lapse between productive cycles.

With the above and other objects in view, as will appear to those skilled in the art from the present disclosure, this invention includes all features in the said disclosure which are novel over the prior art.

In the accompanying drawings, in which certain modes of carrying out the present invention are shown for illustrative purposes:

Fig. 1 is a view in front elevation of the two complemental mold-members shown in their separated positions together with their respective mounting-plates and associated features, the contact-holding bar being shown as installed in the lower mold together with a plurality of contact-members, a portion of the lower mold being broken away to expose the contact-holding bar and certain of the contact-members shown in transverse section;

Fig. 2 is a perspective view of the upper mold-member together with its mounting-plate and associated features looking mainly toward the under faces thereof;

Fig. 3 is a perspective view looking mainly toward the upper face of the lower mold-member and its associated features, together with a portion of the contact-holding bar which latter is partly broken away;

Fig. 4 is a transverse sectional view taken on the line 4—4 of Fig. 1;

Fig. 5 is a view similar to Fig. 4 but showing the respective upper and lower mold-members engaged with insulating material formed around the contact-members;

Fig. 6 is a perspective view of the contact-holding bar shown as stripped;

Fig. 7 is a perspective view of the contact-locking member;

Fig. 8 is a perspective view of the contact-holding bar shown as having a plurality of contact-members mounted therein and locked therein by means of the contact-locking member, preparatory to being installed in the lower mold-member;

Fig. 9 is a perspective view of one of the studs of the contact-holding bar;

Fig. 10 is a perspective view of a completed electric plug as produced by the apparatus of Figs. 1 to 8 inclusive;

Fig. 11 is a top or plan view of a molding-apparatus suitable for molding female terminals on electric conductors;

Fig. 12 is a broken transverse sectional view taken on the line 12—12 of either Fig. 11 or Fig. 13;

Fig. 13 is a broken view in front elevation of the showing of Figs. 11 and 12;

Fig. 14 is an end view of the contact-holding bar and associated features, detached and showing the upper and lower wire-holding bars latched together;

Fig. 15 is a transverse sectional view of the contact-holding bar and associated features corresponding to the location 12—12 of Fig. 11, but showing the upper and lower wire-holding bars unlatched and retired;

Fig. 16 is a perspective view of the contact-holding bar and its associated features and showing the respective wire-holding bars slightly separated;

Fig. 17 is a broken detail sectional view taken on the line 17—17 of Fig. 11; and Fig. 18 is a perspective view of a completed female terminal-member or connector as produced by the apparatus of Figs. 11 to 17 inclusive.

Figure 1:
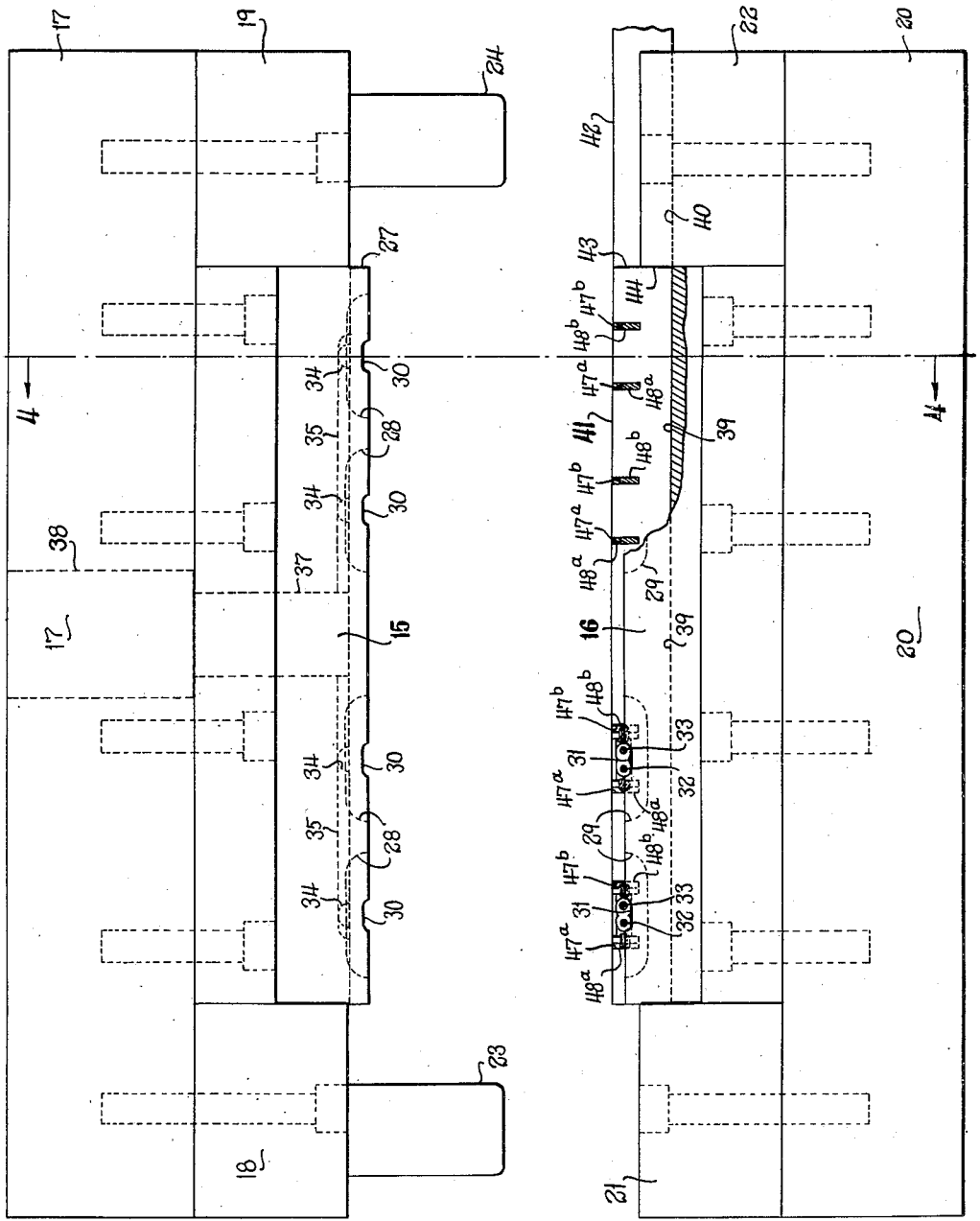

The showing of Figs. 1 to 10 inclusive

The particular apparatus illustrated in this group of figures for purposes of making clear one form of the present invention, is designed for the production of double-prong plugs and includes an upper mold-member 15 and a complemental lower mold-member 16.

The upper mold-member 15 is rigidly attached to the under face of an upper mounting-plate 17 and is flanked at each of its respective opposite ends by a left end-block 18 and a right end-block 19 also rigidly secured to the under face of the mounting-plate 17.

The lower mold-member 16 is rigidly attached to the upper surface of a lower mounting-plate 20 and is flanked at its left and right ends respectively by end-blocks 21 and 22 also rigidly attached to the upper surface of the mounting-plate 20.

Extending downwardly from the end-block 18 of the upper mounting-plate 17 is a dowel-pin 23, while a similar dowel-pin 24 projects downwardly from the companion end-block 19. The dowel-pins 23 and 24 are adapted to respectively enter sockets 25 and 26 when the two complemental mold-members 15 and 16 are brought together, to thus accurately align the said mold-members. The socket 25 is formed in the end-block 21, while the socket 26 is formed in the companion end-block 22 of the lower mounting-plate 20 as is indicated in Fig. 3.

The upper and lower mounting-plates 17 and 20 may be mounted in any suitable injection-molding press in such manner that either or both of the said mold-members may be moved toward and away from each other between the positions indicated respectively in Figs. 4 and 5, in a manner well understood in the art.

As is especially well shown in Fig. 2, the upper mold-member 15 is formed adjacent its forward edge with a downwardly-extending longitudinal rib 27 in which is formed in side-by-side relationship four (more or less) body-forming cavities 28 respectively adapted to register with and complement a similar number of body-forming cavities 29 formed in the upper face of the lower mold-member 16 adjacent the forward edge thereof, as is especially well shown in Fig. 3.

Leading forwardly from each of the body-forming cavities 28 in the upper mold-member 15 is a wire-receiving passage 30, each of which is adapted to register with a similar wire-receiving passage 31 formed in the upper face of the front portion of the lower mold-member 16. A given one of the wire-receiving passages 30 in the upper mold-member 15, in conjunction with the registering wire-receiving passage 31 in the lower mold-member 16, is adapted to snugly receive a complemental pair of insulated electric wires 32 and 33, for purposes as will hereinafter appear.

Formed in the under face of the upper mold-member 15 and leading rearwardly respectively from each of the body-forming cavities 28 is one of a plurality of so-called "gates" 34 each of which communicates at its rear end with a so-called "runner" 35 extending longitudinally in the under face of the upper mold-member 15. The said runner 35 is adapted to register with a similar runner 36 formed in the upper face of the lower mold-member 16.

Extending vertically through the upper mold-member 15 and communicating at its lower end with the central portion of the runner 35 therein, is a sprue 37. At its upper end the said sprue 37 communicates with the lower end of a feed-passage 38 formed in the upper mounting-plate 17 and through which a suitable-flowable insulating material (rubbers, synthetic resins etc.) may be fed into the features 34 to 38 inclusive above described.

Formed in the upper face of the lower mold-member 16 immediately to the rear of the plurality of body-forming cavities 29 therein, is a longitudinal holder-receiving groove or recess 39 communicating at its right end with a clearance-groove 40 formed in the right end-block 22. The said clearance-groove forms a continuation of the holder-receiving groove 39, as is especially well shown in Fig. 3.

The longitudinal holder-receiving groove 39 just above referred to, is located forwardly of the runner 36 in the lower mold-member 16 and is adapted to receive, with a smooth sliding-fit, a contact-holding bar 41 which is provided with an integral extension 42. The extension 42 is narrower from front to rear than the main portion of the contact-holding bar though its rear face is flush with the rear face of the said contact bar, as is especially well shown in Figs. 6 and 8. The described difference in width between the contact-holding bar 41 proper and its integral extension 42 results in the formation of a stop-shoulder 43 facing to the right and adapted to engage a stop-shoulder 44 on the inner face of the end-block 22 at a point forwardly of the clearance-groove 40, to thus locate the bar 41 with respect to the cavities 29 and hold the said bar against lengthwise displacement.

Extending lengthwise through the contact-holding bar 41 as well as through its integral extension 42, is a groove 45 in which extends a rod-like contact-locking member 46 for purposes as will hereinafter appear. Extending transversely of the contact-holding bar 41 and intersecting both its front and rear faces is a plurality of pairs of contact-receiving grooves 47a—47b.

The pairs of contact-receiving grooves 47a—47b are so positioned in the bar 41 as to have their forward ends respectively register with the body-forming cavities 29 in the lower mold-member 16. Each pair of contact-receiving grooves 47a—47b is adapted to snugly receive a pair of plate-like contact-prongs 48a—48b.

Each of the said contact-prongs 48a—48b is of sufficient length to project forwardly beyond the front face of the contact-holding bar 41 when positioned so that its perforation 49 is aligned with the longitudinal-groove 45 in the said bar 41 and hence in position to receive the contact-locking member 46. The said contact-locking member 46, in addition to extending through the perforations 49 in the various contact-prongs 48a—48b, also extends through perforations 50 one of which is formed in each of a plurality of studs 51.

The studs 51 are respectively drive-fitted into suitable sockets which form lateral enlargements of the longitudinal-groove 45 in the bar 41, in such manner that the respective perforations of the said studs 50 are coaxial with each other and with the perforations 49 in the contact-prongs 48a—48b to jointly receive the inner portion of the contact-locking member 46.

The contact-prongs comprising each pair 48a—48b, have respectively electrically connected (as by soldering or the like) to their projecting ends the bared terminal ends of the wires 32—33.

*Operation*

For purposes of making clear the operation of the apparatus illustrated in Figs. 1 to 9 inclusive, it may be first assumed that the upper and lower mold-members 15 and 16 are separated from each other, as is shown in Figs. 1 and 4. It may further be assumed that the pre-loaded contact-holding bar 41 is installed in the holder-accommodating groove 39 in the lower mold-member 16 with a pair of contact-prongs 48a—48b projecting into each body-forming cavity 29 and with the complemental pair of insulated wires 32 and 33 extending outwardly through the aligned one of the wire-receiving passages 31, as is indicated in Figs. 3 and 4.

Now when the upper mold-member 15 is brought downwardly into engagement with the lower mold-member 16, as is indicated in Fig. 5 or vice versa, each of the body-forming cavities 28 in the said upper mold-member will register with and complement one of the body-forming cavities 29 in the lower mold-member 16, and thus provide a plurality of full body-forming cavities.

Also under the conditions above described, each of the wire-receiving passages 30 in the upper mold-member 15 will register with and complement one of the similar passages 31 in the lower mold-member 16 and thus provide a completely enveloping passage for holding a pair of insulated wires 32 and 33.

Now when any suitable-flowable insulating material is forced downwardly through the feed-passage 38 in the upper mounting-plate 17 and into the sprue 37 in the upper mold-member 15, the said insulating material will flow through the runners 35 and 36 and gates 34, into each of the full cavities provided by the mating pairs of body-forming cavities 28 and 29. The insulating material thus forced under pressure into the body-forming cavities will surround the projecting ends of the contacts 48a—48b and the inner attached ends of their respective insulated wires 32 and 33 to simultaneously form a plurality of complete bodies 52 each having two contact-prongs 48a—48b projecting from one end and a pair of wires 32—33 projecting from the other end as is shown in Figs. 5 and 10.

The insulating material employed is usually introduced into the molds while hot and if of the thermosetting type it may be so compounded as to set properly in the brief interval between cycles.

Now when the upper and lower die-members 15, 16 are separated, the group of newly formed double-pronged plugs together with the connecting parts formed in the gates 34 and runners 35 and 36 may be removed by lifting the contact-holding bar 41 out of the longitudinal grooves 39 and 40. Another contact-holding bar like 41 having previously been supplied with a plurality of pairs of contact-prongs, similar to 48a—48b, may be immediately installed in the lower mold-member 16 and the cycle of the press immediately repeated while the original contact-holding bar is being relieved of its fully formed plugs. The plugs may be readily released from the just-used bar 41 by withdrawing the contact-locking member 46.

From the foregoing it will be seen that a number of contact-holding bars like 41 may be provided, with one or more assistants assigned specifically to the task of loading and unloading such bars. Under these conditions, the press operator need only remove a contact-holding bar with its set of completely-formed plugs (Fig. 10) from the lower die, and substitute therefor a similar contact-holding bar previously loaded with the pairs of contact-prongs 48a—48b and their respective pairs of wires 32—33 as supplied by one or more assistants. Thus, by means of the present invention, a given set of mold-members may be kept in almost continuous operation without requiring the long pauses between cycles necessary under ordinary conditions in order to load the mold with individual contact-prongs or other contact-members.

*The showing of Figs. 11 to 18 inclusive*

The particular apparatus illustrated in this group of figures for purposes of making clear another embodiment of the present invention, is designed for the production of double-socket female connectors of the general character shown in complete form in Fig. 18. The said connector comprises a body 53 formed of insulating material and within which is embedded in spaced-apart parallel relationship, two tubular contact-members 54a and 54b, each of which has its outer end-portion bifurcated or otherwise rendered laterally yielding, as is indicated in Fig. 11. The inner ends of the said tubular contact-members respectively receive the ends of a pair of complemental wires 55a and 55b secured (as by crimping or solder) in tight electrical engagement with the said contact-members.

Fitting over the bifurcated outer end of each of the contact-members 54a and 54b is an insulating tubular shield 56 serving purposes as will hereinafter appear.

The double-socket female connector illustrated in Fig. 18 is of substantially conventional form and may be produced by a suitable molding apparatus, such as one including a mold-member 57 formed in its upper face with four (more or less) body-forming cavities 58 arranged in side-by-side relationship, as is especially well shown in Fig. 11. Leading forwardly from each of the body-forming cavities 58 is a wire-receiving passage or groove 59 intersecting the front edge of the mold-member 57 and each of which is adapted to accommodate a pair of complemental insulated electric wires such as the pairs of wires 55a—55b before referred to.

Located immediately to the rear of the body-forming cavities 58 in the mold-member 57 is a longitudinal holder-receiving groove or recess 60 intersecting the respective opposite ends of the said mold-member and laterally intersected by the adjacent end of each of the body-forming cavities 58.

The longitudinal holder-receiving groove 60 in the mold-member 57 is adapted to removably and replaceably receive a contact-holding bar 61. Projecting forwardly from the front edge of the said contact-holding bar are four (more or less) pairs of contact-holding studs 62a–62b so arranged that a given pair of the said studs project forwardly into one of the body-forming cavities 58 in the mold-member 57.

Each of the contact-holding studs 62a–62b above referred to is formed with a relatively-large-diametered base 63 located immediately adjacent the front face of the contact-holding bar 61. Each pair of contact-holding studs 62a–62b is adapted to have frictionally fitted over them the bifurcated outer ends of a given pair of tubular contact-members 54a–54b. When a given tubular contact-member is slipped over a stud 62a or 62b, the tubular insulating shield 56 of such a contact-member, will snugly fit over the base 63 of the stud in question and will shield the slotted outer end of the contact-member from having insulating material flowed thereinto.

Rigidly secured to each of the opposite ends of the contact-holding bar 61 is one of two complemental end-blocks 64a–64b respectively having their inner faces in close proximity to the adjacent end faces of the mold-member 57, as is shown in Fig. 11.

Projecting forwardly respectively from the end-blocks 64a–64b is one of a pair of locating-arms 65a–65b. Located above the locating-arms 65a–65b is an upper wire-molding bar 66 provided with two rearwardly-projecting rigid arms 67a–67b respectively pivotally connected to the upper portion of the end-blocks 64a–64b of the contact-holding bar 61.

Located below the locating-arms 65a–65b is a lower wire-holding bar 68 complementing the wire-holding bar 66. The wire-holding bar 68 is provided with a pair of rigid rearwardly-extending arms 69a–69b respectively pivotally connected to the lower forward portions of the end-blocks 64a–64b.

The lower wire-holding bar 68 is formed with four (more or less) transverse wire-receiving notches 70 respectively aligned with the four wire-receiving passages 59 in the mold-member 57.

Secured to the front face of the lower wire-holding bar 68, with capacity for limited movement with respect thereto, is a latching plate 71 having four (more or less) upwardly-and-outwardly-flaring wire-guiding notches 72 in its upper edge. Each flaring wire-guiding notch 72 registers with one of the wire-receiving notches 70 in the lower wire-holding bar 68, as is especially well shown in Figs. 11 an 16.

The latching-plate 71 is provided adjacent its respective opposite ends with one of two similar rearwardly-projecting latching-studs 73a–73b respectively adapted to enter upwardly-opening latching-notches 74a–74b formed in the upper wire-holding bar 66 before described, so as to releasably hold the two bars 66 and 68 in their closed position, as is shown in Figs. 11 to 14 inclusive.

For the purpose of securing the latching-plate 71 to the front face of the lower wire-holding bar 68 so that the said latching-plate may have relative tilting movement with respect to the bar 68, the latter bar has rigidly projecting forwardly from points adjacent its respective opposite ends, one of two studs 75a–75b respectively extending outwardly through one of two clearance-openings 76a–76b formed in the latching-plate 71. Interposed between the inner face of the head of each of the studs 75a–75b and the front face of the latching-plate 71, is one of two similar helical compression-springs 77a–77b. The compression-springs just referred to serve to yieldingly hold the front plate 71 against the lower wire-holding bar 68, while permitting the said front plate to be tilted outwardly to effect the disengagement of its latching-studs 73a–73b from the latching-notches 74a–74b of the upper wire-holding bar 66 as indicated by broken lines in Fig. 15.

Formed in the upper face of the contact-holding bar 61 is a longitudinal groove-like runner 78 from which forwardly leads four (more or less) gates 79 which latter respectively lead into the body-forming cavities 58 in the mold-member 57.

Operation

The contact-holding bar 61 may have its upper and lower wire-holding bars 66 and 68 unlatched from each other (by outwardly-tilting the latching-plate 71) and swung backwardly substantially into the positions in which they are shown in Fig. 15. A pair of tubular contact-members 54a–54b may be slipped over each pair of contact-holding studs 62a–62b so that the tubular shields 56 will fit over the respective bases 63 of the said studs in the manner indicated in the left portion of Fig. 11.

The two wire-holding bars 66 and 68 may now be brought into closed relationship as is indicated in Figs. 11 to 14 inclusive, and latched in such position by the latching-plate 71. When closed as just described, the locating-arms 65a–65b will serve to restrain the now-latched-together bars 66 and 68 from all but very slight swinging movement with respect to the contact-holding bar 61. As the two wire-holding bars 66 and 68 are brought together, the tapering wire-guilding notches 72 in the front plate 71 will serve to guide each of the four pairs of wires 55a–55b respectively into the wire-receiving notches 70 in the lower wire-holding bar 68.

When the two wire-holding bars 66 and 68 are latched together as above described and as is shown in Figs. 11 to 14 inclusive, each pair of wires 55a–55b will be held in substantial alignment with the contact-holding studs 62a–62b so as to offset the tendency of the contact-members 54a–54b to pull off of the contact-holding studs 62a–62b if the pairs of wires 55a–55b were permitted to sag.

The now-loaded contact-holding bar 61 may now be installed in the holder-receiving groove 60 of the mold-member 57, so that all of the parts carried by the said bar assume the positions illustrated in Figs. 11 to 14 inclusive.

Now when a suitable mold-member (not shown) complementing the mold-member 57 is brought down against the upper face of the said mold-member 57 in a manner similar to that described in connection with the showing of Figs. 1 to 10 inclusive, suitable insulating material may be flowed through the runner 78 and its gates 79 into each of the body-forming cavities 58, to thus flow around the tubular contact-members 54a—54b and the adjacent ends of the wires 55a—55b, to form the body 53 and the complete double-socket female connector illustrated in Fig. 18. During the flowing of the insulating material as just described, the tubular shields 56 will prevent such insulating material from flowing into the slots in the outer portions of the contact-members 54a—54b.

From the foregoing it will be seen that a plurality of contact-holding bars like 61 may be preloaded and then installed one at a time in a mold-member such as 57 to achieve the advantages described in connection with the use of the contact-holding bar 41 of the showing of Figs. 1 to 10 inclusive.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. An apparatus for molding electric-cord terminals of the type which includes an insulating body and one or more contact-prongs projecting from the said body and each contact-prong having a transverse opening in its projecting portion, the said apparatus including in combination: a mold-member provided with a plurality of body-forming cavities and with a holder-accommodating portion located adjacent the said body-forming cavities; a removable and replaceable portable contact-holding member engageable with the said holder-accommodating portion and having a plurality of spaced-apart contact-holding means respectively registering with the body-forming cavities in the said mold-member when the contact-holding member is engaged with the said holder-accommodating portion, the said removable and replaceable contact-holding member being provided with contact locking-member-engaging means, and said contact-holding means being constructed and arranged to hold a plurality of contact-prongs in such manner that the said contact-prongs project therefrom into the body-forming cavities in the said mold-member; and a common contact-locking member engageable with the contact locking-member-engaging means of the said contact-holding member and extendable through the transverse openings in the said contact-prongs to releasably hold the latter in the said contact-holding member; whereby the said contact-holding member may have the said plurality of contact-prongs assembled in locked relationship with its plurality of contact-holding means and locked therein by the said contact-locking member while the said contact-holding member is entirely separate from the said mold-member, and the said contact-holding member may then be installed in engagement with the holder-accommodating portion of the said mold-member as a unit together with the said plurality of contact-prongs.

2. An apparatus for molding electric-cord terminals of the type which includes an insulating body and one or more contact-prongs projecting from the said body and each contact-prong having a transverse opening in its projecting portion, the said apparatus including in combination: a mold-member provided with a plurality of body-forming cavities and with a holder-accommodating portion located adjacent the said body-forming cavities; a removable and replaceable portable contact-holding member engageable with the said holder-accommodating portion and having a plurality of spaced-apart contact-holding means respectively registering with the body-forming cavities in the said mold-member when the contact-holding member is engaged with the said holder-accommodating portion, the said removable and replaceable contact-holding member being provided with contact locking-member-engaging means, and said contact-holding means being constructed and arranged to hold a plurality of contact-prongs in such manner that the said contact-prongs project therefrom into the body-forming cavities in the said mold-member; a common contact-locking member engageable with the contact locking-member-engaging means of the said contact-holding member and extendable through the transverse openings in the said contact-prongs to releasably hold the latter in the said contact-holding member; whereby the said contact-holding member may have the said plurality of contact-prongs assembled in locked relationship with its plurality of contact-holding means and locked therein by the said contact-locking member while the said contact-holding member is entirely separate from the said mold-member, and the said contact-holding member may then be installed in engagement with the holder-accommodating portion of the said mold-member as a unit together with the said plurality of contact-prongs; and a second mold-member constructed and arranged to cooperate with the first-mentioned mold-member and to hold the said contact-holding member in engagement with the holder-accommodating portion of the first-mentioned mold-member.

3. An apparatus for molding electric-cord terminals of the type which includes an insulating body and one or more contact-prongs projecting from the said body and each contact-prong having a transverse opening in its projecting portion, the said apparatus including in combination: a mold-member provided with a plurality of body-forming cavities arranged side by side and with a bar-accommodating recess communicating laterally with each of the said plurality of body-forming cavities; a removable and replaceable portable contact-holding bar fitting in the said bar-accommodating recess and having a plurality of spaced-apart contact-receiving recesses extending transversely thereof and respectively registering with the body-forming cavities in the said mold-member when the contact-holding bar is in the said bar-accommodating recess, the said removable and replaceable contact-holding bar being provided with a longitudinal passage and contact locking-member engaging-means therein constructed and arranged to hold a rod-like contact-locking member, the said contact-receiving recesses of said removable and replaceable contact-holding bar being constructed and arranged to hold a plurality of contact-prongs in such manner that the said contact-prongs project therefrom into the body-forming cavities in the said mold-member; and a rod-like contact-locking member extendable through the longitudinal passage in the said contact-holding bar and said contact locking-member engaging-means thereof and extendable through the transverse openings in the said contact-prongs to releasably hold the latter in the said contact-holding bar; whereby the said contact-holding bar may have the said plurality of contact-prongs assembled with its plurality of contact-receiving recesses and locked therein by the said contact-locking member while the said contact-holding bar is entirely separate from the said mold-member, and the said contact-holding bar may then be installed in the holder-accommodating recess in the said mold-member as a unit together with the said plurality of contact-prongs.

4. An apparatus for molding electric-cord terminals of the type which includes an insulating body and one or more contact-prongs projecting from the said body and each contact-prong having a transverse opening in its projecting portion, the said apparatus including in combination: a mold-member provided with a plurality of body-forming cavities arranged side by side and with a bar-accommodating recess communicating laterally with each of the said plurality of body-forming cavities; a removable and replaceable portable contact-holding bar fitting in the said bar-accommodating recess and having a plurality of spaced-apart contact-receiving recesses extending transversely thereof and respectively registering with the body-forming cavities in the said mold-member when the contact-holding bar is in the said bar-accommodating recess, the said removable and replaceable contact-holding bar being provided with a longitudinal passage and contact locking-member engaging-means therein constructed and arranged to hold a rod-like contact-locking member, the said contact-receiving recesses of said removable and replaceable contact-holding bar being constructed and arranged to hold a plurality of contact-prongs in such manner that the said contact-prongs project therefrom into the body-forming cavities in the said mold-member; a rod-like contact-locking member extendable through the longitudinal passage in the said contact-holding bar and said contact locking-member engaging-means thereof and extendable through the transverse openings in the said contact-prongs to releasably hold the latter in the said contact-holding bar; whereby the said contact-holding bar may have the said plurality of contact-prongs assembled with its plurality of contact-receiving recesses and locked therein by the said contact-locking member while the said contact-holding bar is entirely separate from the said mold-member, and the said contact-holding bar may then be installed in the holder-accommodating recess in the said mold-member as a unit together with the said plurality of contact-prongs; and a second mold-member constructed and arranged to cooperate with the said first mold-member and to hold the said contact-holding bar in the said bar-accommodating recess of the first-mentioned mold-member.

CARL H. JUDISCH.

REFERENCES CITED

The following references are of record in the file of this patent:

UNITED STATES PATENTS

| Number | Name | Date |
|---|---|---|
| 42,894 | Williams | May 24, 1864 |
| 330,109 | Goodman | Nov. 10, 1885 |
| 1,161,191 | Cook | Nov. 23, 1915 |
| 2,120,502 | Morton | June 14, 1938 |
| 2,324,978 | Lohrand et al. | July 20, 1943 |

OTHER REFERENCES

Rahm, "Plastics Molding," published by McGraw Hill Pub. Co., 1933, pages 78–79. (Copy in Division 15.)